(12) United States Patent
Hasskerl et al.

(10) Patent No.: US 7,968,193 B2
(45) Date of Patent: Jun. 28, 2011

(54) HAIL-RESISTANT ACRYLIC LAMINATED GLASS AND METHOD FOR PRODUCING THE SAME

(75) Inventors: Thomas Hasskerl, Kronberg (DE); Rolf Neeb, Pfungstadt (DE); Ghirmay Seyoum, Egelsbach (DE); Wolffgang Wiebel, Haibach (DE)

(73) Assignee: Evonik Roehm GmbH, Darmstadt (DE)

( * ) Notice: Subject to any disclaimer, the term of this patent is extended or adjusted under 35 U.S.C. 154(b) by 783 days.

(21) Appl. No.: 10/500,362

(22) PCT Filed: Feb. 21, 2003

(86) PCT No.: PCT/EP03/01788
§ 371 (c)(1),
(2), (4) Date: Jun. 28, 2004

(87) PCT Pub. No.: WO03/078485
PCT Pub. Date: Sep. 25, 2003

(65) Prior Publication Data
US 2005/0016213 A1    Jan. 27, 2005

(30) Foreign Application Priority Data
Mar. 20, 2002 (DE) .................................. 102 12 458

(51) Int. Cl.
*B32B 27/30* (2006.01)
(52) U.S. Cl. ..................................... 428/411.1; 428/447
(58) Field of Classification Search ............... 428/411.1, 428/447
See application file for complete search history.

(56) References Cited

U.S. PATENT DOCUMENTS

| | | | | |
|---|---|---|---|---|
| 3,793,402 | A | * | 2/1974 | Owens ............................. 525/81 |
| 5,294,472 | A | | 3/1994 | Arnold et al. |
| 5,385,988 | A | * | 1/1995 | Yamamoto et al. ............ 525/479 |
| 5,880,235 | A | | 3/1999 | Schwind et al. |
| 2004/0191485 | A1 | | 9/2004 | Groothues et al. |
| 2004/0213989 | A1 | | 10/2004 | Hasskerl et al. |
| 2005/0118434 | A1 | | 6/2005 | Hasskerl et al. |

FOREIGN PATENT DOCUMENTS

| | | |
|---|---|---|
| DE | 2951763 | 7/1980 |
| DE | 4301848 | 7/1994 |

OTHER PUBLICATIONS

U.S. Appl. No. 10/546,525, filed Aug. 23, 2005, Wiebel, et al.
U.S. Appl. No. 10/548,878, filed Sep. 14, 2005, Hasskerl, et al.
U.S. Appl. No. 10/523,971, filed Feb. 8, 2005, Theil, et al.
U.S. Appl. No. 10/539,057, filed Jun. 15, 2005, Hasskerl, et al.
U.S. Appl. No. 10/538,887, filed Jun. 14, 2005, Hasskerl, et al.
U.S. Appl. No. 10/539,126, filed Jun. 16, 2005, Hasskerl, et al.
Brand et al., "NMR-Spectroscopic Investigation on the Hydrolysis of Functional Trialkoxysilanes," Zeitung fur Naturforschung, 54B:155-164 (1999).
Pfeiffer, Farbe und Lack, 11:38-43, 2005 (with English translation).
Beari et al., "Organofunctional Alkoxysilanes in Dilute Aqueous Solution: New Accounts on the Dynamic Structure Mutability," J. Organometallic Chem., 625:208, pp. 1-15 (2001).
http://en.wikipedia.org/wiki/Colloidal_silica retrieved Dec. 13, 2010.
Ullmanns Encyclopedia of Industrial Chemistry, Otto Flörke; "Colloidal Silica", p. 36-51, Published Online, Apr. 15, 2008 (Do/: 10.1002/14356007.a23-583.pub3.
Daniels et al, Journal of Colloid and Interface Science, 1999, vol. 219, pp. 351-356.

* cited by examiner

*Primary Examiner* — Callie E Shosho
*Assistant Examiner* — Elizabeth Robinson
(74) *Attorney, Agent, or Firm* — Oblon, Spivak, McClelland, Maier & Neustadt, L.L.P.

(57) ABSTRACT

The invention relates to polymerisable compositions obtained as follows: a) reaction of A) between 0.5 and 5 parts by weight of at least one silicon compound of formula (I): SimR1nR2oOrXs with B) between 0.01 and 2.0 parts by weight of water C) between 0 and 4.0 parts by weight of at least one acid; and b) subsequent addition of D) between 0.5 and 5 parts by weight of at least one (meth)acrylate of formula (II), E) between 98.99 and 55 parts by weight of at least one polymerisable, ethylenically unsaturated monomer, different from D) and F) between 0 and 30 parts by weight of at least one polymer and/or copolymer, which is obtained by the polymerisation or copolymerisation of at least one ethylenically unsaturated monomer E). The invention also relates to polymers and laminate glass obtained from the composition and to a method for producing laminate glass.

22 Claims, No Drawings

HAIL-RESISTANT ACRYLIC LAMINATED GLASS AND METHOD FOR PRODUCING THE SAME

The present invention relates to a polymerizable composition, to laminated glass and polymers obtainable therefrom, to a process for producing laminated glass, and also to use of the laminated glass. The inventive laminated glass has high hail resistance, bond strength, stiffness, gas impermeability, scratch resistance, impact resistance, and chemicals resistance, and also has low density, and is therefore particularly suitable for any type of glazing.

It is known that glazing composed of conventional glass, such as silicate glass, is comparatively heavy, making it disadvantageous for many applications. Attempts are therefore often made to replace this by glazing based on high-transparency plastics, such as polymethyl methacrylate and polycarbonate. However, the limits of technical feasibility are often encountered here, because the property profiles of transparent plastics and conventional glass are different.

By way of example, the polar character of PMMA is the cause of relatively high water absorption, and, associated with this, swelling and dimensional change via water absorption and, respectively, drying. Furthermore, PMMA is gas-permeable, the consequence being that, in particular in the case of panes composed of this material, gases diffuse through the material and can deposit in the form of a liquid condensate, for example in the case of water vapor, thus adversely affecting the transparency of double glazing, for example.

To solve this problem, surface coatings with gas-impermeable barrier layers have been proposed. Wo 98/40531 describes a method for achieving gas impermeability of containers made from synthetic polymers by using plasma-assisted deposition to produce a coating of a thin inorganic oxide layer. By way of example, this process may be applied in the case of polyethylene terephthalate (PET) for drinks bottles. However, PMMA can be damaged by plasma and is therefore not suitable for this type of treatment.

Another factor to be taken into account in this context is that although the use of thin barrier layers to coat plastics improves gas permeability, it does not improve stiffness and does not ensure the durability which is particularly demanded to a high degree for glazing.

An alternative approach to improving the gas impermeability of plastics is provided by laminated panes composed of silicate glass and of a plastics core. By way of example, BP 1 600 867 (James Wallace Langlands) describes a safety glass in which an unsaturated polyester resin is introduced and cured between two glass panes. To promote adhesion between the plastics core and the silicate glass, γ-methacryloxypropyltrimethoxysilane is added to the resin. The resin may be provided with dye, wire mesh, or decorative fillers in order to achieve specific effects. A particular reinforcing effect can be achieved by using a resin with relatively high shrinkage and utilizing the internal stress resulting from the shrinkage to increase impact strength. A disadvantage of these systems is the limited weathering resistance of unsaturated polyesters, and the risk of loss of adhesion between glass pane and plastics core, due to the artificially retained stress.

DE 430 1848 (Werner Siol et al.) describes a laminated system composed of two panes of acrylic sheet and, between these, an adhesive layer, composed of a thermoplastic elastomer. The thermoplastic elastomer comprises a comb polymer, and its tensile strain at break is 433%. The laminated sheet is produced via pressing of the three layers at 180° C. and cooling at 50 bar. Although this laminated sheet has the advantage of good bond strength under hammer impact, it is no more scratch-resistant than conventional acrylic sheet. Stiffness if markedly lower than that of silicate glass.

JP 77-59,617 (May 17, 1977) describes a laminated system composed of silicate glass films of thickness 50 micrometers with, between these, a photosensitive adhesive layer. The laminate can be cut with scissors. The laminated system has low stiffness.

JP 79-96,541 (Tejin Ltd.; Jul. 31, 1979) describes laminated glass with an radiation-curable intermediate layer of adhesive based on polyvinyl butyral with glycidyl methacrylate content, and having a thickness of 0.03 mm.

DE 2 951 763 (Bridgestone, Jul. 3, 1980) describes automotive safety glass composed of two glass panes with an intermediate layer composed of a photo-curable adhesive which comprises the silane as adhesion promoter.

The examples of the two last-mentioned patent specifications involve panes which are stiff and gas-impermeable but are heavy, because the intermediate polymer layer is thin and the silicate glass content of the entire composite is high.

The hail resistance of silicate glass and PMMA, unlike that of impact-resistant plastics such as polycarbonate, is inadequate for many applications.

Although the impact strength of polycarbonate makes it markedly more hail-resistant, it has the disadvantage that its weathering resistance is lower than that of PMMA and silicate glass. Numerous attempts have been made to combine the weathering resistance of PMMA with the impact resistance of polycarbonate. Impact-resistant PMMA sheets have been produced from extruded PMMA with a content of impact-resistant spherical elastomeric particles. The elastomeric particles comprise a plasticizing monomer, e.g. butyl acrylate, a high-refractive-index monomer to adjust the refractive index, e.g. styrene, and a crosslinking agent. A disadvantage of these sheets is that, in comparison with pure PMMA, the aromatic content causes impairment of weathering resistance and a loss of stiffness, which is seen in the lower modulus of elasticity. Adequate hail resistance together with good weathering resistance and stiffness can therefore be achieved only via relatively high sheet thickness and, associated therewith, relatively high weight.

In the light of the prior art, it was then an object of the present invention to provide laminated glass with an improved property profile. In particular, the laminated glass should have:
⇒maximum hail resistance,
⇒maximum weathering resistance,
⇒maximum bond strength,
⇒maximum stiffness,
⇒maximum gas impermeability,
⇒maximum scratch resistance,
⇒maximum chemicals resistance,
⇒maximum impact strength, and
⇒minimum density.

Another object of the present invention was to provide processes for producing the inventive laminated glass, and also possible application sectors for its use.

Provision of a polymerizable composition with all of the features of claim 1, with excellent suitability for the production of laminated glass with an improved property profile achieves these objects, and also achieves other objects which, although not explicitly mentioned, are readily derivable or deducible from the circumstances discussed in the introduction above. Advantageous embodiments of the polymerizable composition are protected in the subclaims dependant on claim 1. The laminated glass and polymers obtainable via polymerization of the inventive composition are described in claims 17 to 19, while the process claims provide processes for producing the inventive laminated glass. The use claim protects a preferred use of the inventive laminated glass.

Provision of a polymerizable composition obtainable via:
a) reaction of
   A) from 0.5 to 5 parts by weight of at least one silicon compound of the formula (I):

$$Si_mR^1_nR^2_oO_rX_s \quad (I)$$

where each $R^1$, independently of the others, is an alkenyl or cycloalkenyl radical having from 2 to 12 carbon atoms and optionally having one or more ester groups,
   each $R^2$, independently of the others, is an alkyl or cycloalkyl radical having from 1 to 12 carbon atoms,
   each X, independently of the others, is a halogen atom or an alkoxy group having from 1 to 6 carbon atoms,
   m is a whole number greater than or equal to 1,
   n is a whole number from 1 to 2*m+1,
   o is a whole number from 0 to 2*m,
   r is a whole number from 0 to m−1,
   s is a whole number from 1 to 2*m+1, and
   where m, n, o, and s comply with the relationship (1):

$$n+o+s=2*m+2 \quad (1)$$

with
   B) from 0.01 to 2.0 parts by weight of water, and
   C) from 0 to 4.0 parts by weight of at least one acid;
   and
b) then adding
   D) from 0.5 to 5 parts by weight of at least one (meth) acrylate of the formula (II)

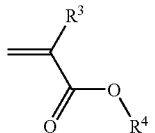

where $R^3$ is a hydrogen atom or a methyl group, and $R^4$ is an aliphatic or cycloaliphatic radical having from 1 to 20 carbon atoms and having at least one hydroxy, thiol, primary amino, secondary amino, and/or one epoxy group,
   E) from 98.99 to 55 parts by weight of at least one polymerizable ethylenically unsaturated monomer other than D),
   F) from 0 to 30 parts by weight of at least one polymer and/or copolymer which is obtainable via polymerization or, respectively, copolymerization of at least one ethylenically unsaturated monomer E),
is a successful and not readily foreseeable method of providing access to a polymerizable composition with excellent suitability for the production of laminated glass with an improved property profile. The laminated glass thus obtainable has a hitherto unknown combination of excellent properties, such as high hail resistance, high weathering resistance, high bond strength, high stiffness, high gas impermeability, high scratch resistance, high impact strength, high chemicals resistance, and low density.

Use of the inventive compositions also permits achievement of a number of other advantages. Among these are:
   The polymers obtainable via polymerization of the inventive compositions are particularly suitable for the bonding of glass to plastics surfaces and in many cases the bonds between these can be stronger than the glass itself. In other words, the adhesive power of the bond between the glass and the plastic is often higher than the cohesive force within the glass itself. However, if one of the inventive constituents is omitted from the mixture of raw materials, the adhesion of the glass panes to the plastic is markedly poorer, in particular during cutting and during temperature cycles.
   The use of the inventive products permits the coating of plastics layers with very thin glass panes, the adhesive force of the bond here mostly being sufficiently high that the glass sheet becomes an integral constituent of the glass composite.
   The adhesion of the polymers obtainable via polymerization of the inventive compositions to glass surfaces is so high that, in laminated glass, the polymers can absorb the stresses and loads arising via expansion and contraction of the glass sheets, resulting from the different coefficients of expansion of glass and plastic.
   Even if the thickness of the glass coating is only 0.1 mm, the glass-coated plastics layers have surprisingly high loading values, attributable to the exceptionally high adhesive power of the inventive mixtures, or of the polymers obtainable therefrom.
   The inventive laminated glass can be produced easily on an industrial scale and at low cost.
   Use of the inventive products as adhesive layer between a thin glass surface and a plastics sheet permits the production of composites which are mainly composed of plastic and therefore have the underlying properties of the plastic but exhibit no shortcomings with respect to wear via friction and gas impermeability. The glass coating increases, by a substantial factor, the weathering resistance of plastics sheets whose open-air weathering resistance is unsatisfactory. Protrusion of the fibers on fiber-reinforced sheets is completely prevented, thus prolonging the lifetime of such sheets substantially.

The present invention provides a polymerizable composition. For the purposes of the present invention, a "polymerizable composition" is a composition which comprises one or more monomers which can be converted via polymerization processes known in the prior art, such as free-radical, anionic, and cationic polymerization, into high-molecular-weight compounds, known as polymers. For the purposes of the present invention, these have a number-average degree of polymerization $P_n$ of at least 10. For further details, reference is made to the disclosure by H. G. Elias, Makromoleküle [Macromolecules], volumes 1 and 2, Basle, Heidelberg, New York Hüithig and Wepf, 1990 and Ullmann's Encyclopedia of Industrial Chemistry, 5th edn., headword "Polymerization Processes".

According to the invention, the polymerizable composition is obtainable by reacting, in a first step,
A) from 0.5 to 5 parts by weight of at least one silicon compound of the formula (I):

$$Si_mR^1_nR^2_oO_rX_s \quad (I)$$

with
B) from 0.01 to 2.0 parts by weight of water, and
C) from 0 to 4.0 parts by weight, advantageously from 0.01 to 4.0 parts by weight, in particular from 0.01 to 2.0 parts by weight of at least one acid.

Each of the radicals $R^1$ here, independently of the others, is an alkenyl or cycloalkenyl radical having from 2 to 12 carbon atoms, and these may have one or more ester groups. Among these radicals are vinyl, propen-(1)-yl, propen-(2)-yl, buten-(3)-yl, penten-(4)-yl, hexen-(5)-yl, hepten-(6)-yl, octen-(7)-yl, nonen-(8)-yl, decen-(9)-yl, undecen-(10)-yl, dodecen- (11)-yl, 2-vinylcyclopentyl, 2-vinylcyclohexyl, γ-methacryloxyethyl, γ-acryloxyethyl, γ-methacryloxypropyl, and γ-acryloxypropyl, and also the known structural isomers of these radicals. For the purposes of the present invention, preferred radicals encompass vinyl, γ-methacryloxyethyl, γ-acryloxyethyl, γ-methacryloxypropyl, and γ-acryloxypropyl, advantageously γ-methacryloxyethyl, γ-acryloxyethyl, γ-methacryloxypropyl, and γ-acryloxypropyl, in particular γ-methacryloxypropyl, and γ-acryloxypropyl. Very particular preference is given here to the γ-methacryloxypropyl radical.

Each of the radicals $R^2$, independently of the others, is an alkyl or cycloalkyl radical having from 1 to 12 carbon atoms, preferably from 1 to 6 carbon atoms, in particular from 1 to 4 carbon atoms. Among these radicals are methyl, ethyl, n-propyl, isopropyl, n-butyl, isobutyl, tert-butyl, n-pentyl, n-hexyl, n-heptyl, n-octyl, n-nonyl, N-decyl, n-undecyl, n-dodecyl, cyclopentyl, and cyclohexyl, and also the known structural isomers of these radicals.

Each of the radicals X independently of the others, is a halogen atom, such as fluorine, chlorine, bromine, or iodine, or an alkoxy group having from 1 to 6 carbon atoms, e.g. a methoxy, ethoxy, n-propoxy, isopropoxy, n-butoxy, sec-butoxy, tert-butoxy, n-pentoxy, or n-hexoxy group. According to one preferred embodiment of the present invention, each X, independently of the others, is a chlorine atom or a bromine atom. According to another preferred embodiment of the present invention, each X, independently of the others, is an alkoxy group having from 1 to 6 carbon atoms, preferably from 1 to 4 carbon atoms, in particular from 1 to 2 carbon atoms.

The index m is a whole number greater than or equal to 1, advantageously in the range from 1 to 10, preferably in the range from 1 to 6, in particular in the range from 1 to 4, i.e. 1, 2, 3, or 4. Very particularly advantageous results are achieved for m=1.

The index n is a whole number from 1 to 2*m+1, advantageously 1 or 2, in particular 1.

The index o is a whole number from 0 to 2*m, advantageously from 0 to 20, preferably from 0 to 2, in particular 0.

The index r is a whole number from 0 to m-1, advantageously from 0 to 9, preferably from 0 to 3, in particular 0.

The index s is a whole number from 1 to 2*m+1, advantageously from 1 to 21, preferably from 1 to 13, in particular from 1 to 9. Very particularly advantageous results are achieved for s=3.

The indices m, n, o, and s here have to comply with relationship (1):

$$n+o+s=2*m+2 \quad (1)$$

For the purposes of one preferred embodiment of the present invention, the inventive composition is obtainable by using at least one s compound of the formula (Ia)

  (Ia)

as silicon compound A). n here is a whole number from 1 to 3 and s=4−n. Silicon compounds of the formula (Ia) therefore encompass $SiR^1X_3$, $SiR^1{}_2X_2$, and $SiR^1{}_3X$.

For the purposes of another preferred embodiment of the present invention, the inventive composition is obtainable by using a mixture comprising at least one silicon compound of the formula (Ia)

  (Ia)

and at least one silicon compound of the formula (Ib)

  (Ib)

instead of the silicon compound A). n in formula (Ia) here is a whole number from 1 to 3, and s=4−n. o in formula (Ib) is a whole number from 1 to 3, and s=4−o. Compounds of the formula (Ib) therefore encompass $SiR^2X_3$, $SiR^2{}_2X_2$, and $SiR^2{}_3X$, in particular alkyltrialkoxysilanes, dialkyldialkoxysilanes, trialkylalkoxysilanes, alkylsilyl trihalides, dialkylsilyl dihalides, and trialkylsilyl halides. Among the compounds of the formula (Ib) particularly preferred according to the invention are trichloromethylsilane, dichlorodimethylsilane, chlorotrimethylsilane, tribromomethylsilane, dibromodimethysilane, bromotrimethylsilane, trichloroethylsilane, dichlorodiethylsilane, chlorotriethylsilane, tribromoethylsilane, dibromodiethylsilane, bromotriethylsilane, trimethoxymethylsilane, dimethoxydimethylsilane, methoxytrimethylsilane, triethoxymethylsilane, diethoxydimethylsilane, ethoxytrimethylsilane, trimethoxyethylsilane, dimethoxydiethylsilane, methoxytriethylsilane, triethoxymethylsilane, diethoxydimethylsilane, and ethoxytrimethylsilane.

According to the invention, particularly advantageous results are obtained using one or more silicon compounds of the formula (Ic)

  (Ic)

as silicon compound A). A particularly successful method here has proven to be the use of vinyltrimethoxysilane, γ-methacryloxyethyltrimethoxysilane, γ-acryloxyethyltrimethoxysilane, γ-acryloxyethyltrimethoxysilane, γ-methacryloxypropyltrimethoxysilane, γ-acryloxypropyltrimethoxysilane, vinyltriethoxysilane, γ-methacryloxyethyltriethoxysilane, γ-acryloxyethyltriethoxysilane, γ-methacryloxypropyltriethoxysilane, γ-acryloxypropyltriethoxysilane, vinyltrichlorosilane, γ-methacryloxyethyltrichlorosilane, γ-acryloxyethyltrichlorosilane, γ-methacryloxypropyltrichlorosilane, γ-acryloxypropyltrichlorosilane, vinyltribromosilane, γ-methacryloxyethyltribromosilane, γ-acryloxyethyltribromosilane, γ-methacryloxypropyltribromosilane, and/or γ-acryloxypropyltribromosilane.

Very particularly suitable silicon compounds of the formula (Ic) encompass the following compounds: γ-methacryloxypropyltriethoxysilane, γ-acryloxypropyltriethoxysilane, γ-methacryloxypropyltrimethoxysilane, γ-acryloxypropyltrimethoxysilane, and/or vinyltriethoxysilane, in particular γ-methacryloxypropyltriethoxysilane.

The silicon compound A) may be used individually or else in the form of a mixture of two or more silicon compounds A).

For the purposes of the invention, acids encompass all of the known inorganic and organic Brønsted acids, preferably organic Brønsted acids. It is also possible to use polyacids, in particular isopolyacids and heteropolyacids, and also mixtures of various acids.

According to the invention, acids which may be used encompass, inter alia, HF, HCl, HBr, HI, $H_2SO_4$, $H_2SO_3$, $H_3PO_4$, formic acid, acetic acid, propionic acid, butyric acid, pentanoic acid, hexanoic acid, citric acid, methacrylic acid, and acrylic acid. Particular preference is given here to the use of ethylenically unsaturated, organic acids, in particular methacrylic acid and acrylic acid, because these are likewise copolymerized during the course of the polymerization of the composition. The inventive acids are preferably water-soluble, advantageously having water solubility>10 g/l at 20° C. According to the invention, the amount of acid is preferably selected in such a way that the pH of the solution composed of the components B) and C) at 20° C. is preferably in the range from 1 to <7, in particular in the range from 4.0 to 6.0.

Although the product from the reaction a) cannot presently be specified precisely, it is presently assumed that the silicon compounds of the formula (I) are at least to some extent hydrolyzed by the water. This hydrolysis is likely to lead to relatively highly condensed products which, where appropriate, have branching and bridging groups of the formula (Id)

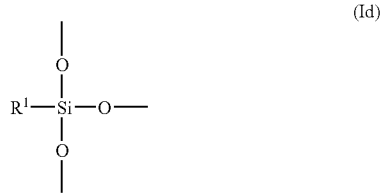

It is also assumed that the acrylic and/or methacrylic acid—if present—condenses at least to some extent with the silicon hydrolysate. However, in this context it should be noted that the teaching of the present invention is in no way linked to the validity of the present interpretation.

The amount of water is preferably from 0.1 to 3.0 mol, advantageously from 2.0 to 3.0 mol, in particular from 2.8 to 3.0 mol, per mole of silicon compound of the formula (I).

The reaction may be conducted in a conventional manner, preferably with stirring. The reaction temperature here may be varied over a wide range, but the temperature is often in the range from 0.0 to 100.0° C., preferably in the range from 10.0 to 60.0° C., in particular in the range from 20 to 30° C. Similar considerations apply to the pressure at which the reaction is completed.

Similar factors apply to the pressure at which the reaction is completed. For example, the reaction may take place either at subatmospheric pressure or else at superatmospheric pressure. However, it is preferably carried out at atmospheric pressure. The reaction may take place in air or else under an inert gas, for example under nitrogen or argon, preferably with a very small proportion of oxygen present.

The end point of the reaction can often be discerned in that the second phase (water) initially present has disappeared and a homogeneous phase is produced. The hydrolysis time here is generally temperature-dependent. The progress of the hydrolysis is faster at a relatively high temperature than at a lower temperature. At a temperature of 22° C., a homogeneous phase is generally formed after as little as 30 min. The result of a higher temperature, e.g. 30° C., is generally that a homogeneous phase forms after as little as 15 min. In contrast, the hydrolysis takes correspondingly longer at lower temperatures. It is advantageous for the hydrolyzed mixture to have a further period of standing or stirring after the hydrolysis and formation of a single phase, in order to ensure that the hydrolysis is complete. To save time, however, the mixing of the hydrolyzed mixture with the remainder of the components and its polymerization may also take place immediately after formation of a single phase. If the standing times after hydrolysis are from a few hours to two or more days, depending on the reaction temperature, condensation of the silanols sometimes begins.

For the purposes of the present invention, the reaction a) is advantageously carried out until a homogeneous solution is obtained. Reaction times which have proven particularly successful in this connection are in the range from 1 minute to 48 hours, advantageously in the range from 15 minutes to 48 hours, in particular in the range from 30 minutes to 4 hours.

According to the invention, the reaction a) is followed, in a second step b), by the addition of D) from 0.5 to 5 parts by weight of at least one (meth)acrylate of the formula (II)

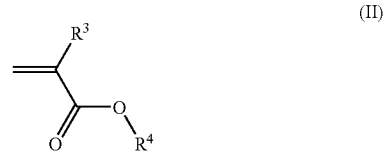

E) from 98.99 to 55 parts by weight of at least one polymerizable ethylenically unsaturated monomer other than D), F) from 0 to 30 parts by weight of at least one polymer and/or copolymer which is obtainable via polymerization or, respectively, copolymerization of at least one ethylenically unsaturated monomer E).

For the purposes of the invention, the term (meth)acrylate encompasses methacrylates and acrylates, and also mixtures of the two.

$R^3$ is a hydrogen atom or a methyl group. $R^4$ is an aliphatic or cycloaliphatic radical having from 1 to 20 carbon atoms, preferably from 1 to 12 carbon atoms, in particular from 2 to 6 carbon atoms, and having at least one hydroxy, thiol, primary amino, secondary amino, and/or one epoxy group.

Among the (meth)acrylates D) which may be used according to the invention are hydroxyalkyl(meth)acrylates, such as 3-hydroxypropyl (meth)acrylate, 3,4-dihydroxybutyl(meth)acrylate, 2-hydroxyethyl(meth)acrylate, 2-hydroxypropyl (meth)acrylate, 2,5-dimethyl-1,6-hexanediol (meth)acrylate, 1,10-decanediol (meth)acrylate, and 1,2-propanediol (meth)acrylate;

polyoxyethylene derivatives of (meth)acrylic acid and polyoxypropylene derivatives of (meth)acrylic acid, e.g. triethylene glycol (meth)acrylate, tetraethylene glycol (meth) acrylate, and tetrapropylene glycol (meth)acrylate;

aminoalkyl(meth)acrylates, such as 2-[N,N-dimethylamino] ethyl(meth)acrylate, 3-[N,N-dimethylamino]propyl (meth)acrylate, and 2-(4-morpholinyl)ethyl (meth)acrylate;

oxiranyl(meth)acrylates, such as 2,3-epoxybutyl (meth)acrylate, 3,4-epoxybutyl(meth)acrylate, and glycidyl(meth) acrylate;

mercaptoalkyl(meth)acrylates, such as 2-mercaptoethyl (meth)acrylate, and 3-mercaptopropyl(meth)acrylate.

For the purposes of the present invention, preferred (meth) acrylates D) encompass hydroxyalkyl (meth)acrylates, aminoalkyl(meth)acrylates, oxiranyl (meth)acrylate, and mercaptoalkyl(meth)acrylates, in particular glycidyl(meth) acrylate. These are preferably used at a proportion by weight>50% by weight, advantageously>75% by weight, in particular >95% by weight, based on all of the (meth)acrylates D).

For the purposes of the present invention, the combination of glycidyl(meth)acrylate (as (meth)acrylates D) with γ-methacryloxypropyltrimethoxysilane (as silicon compound A)) gives a very particular improvement in the resistance of the laminated glass obtainable from the relevant compositions to rapid temperature cycles, and in adhesion, and also in bond strength under mechanical load, for example that arising during sawing or mechanical operations on a laminated pane.

According to the invention, the total amount of (meth) acrylates D) may not exceed 5 parts by weight, because otherwise unfavorable effects can occur in the polymer obtainable via polymerization of the composition, e.g. greater susceptibility to swelling by water if use is made of hydroxyalkyl(meth)acrylates, or marked yellowing if use is made of substituted amino-containing (meth)acrylates.

The ethylenically unsaturated monomers E) which are other than D) are very well known to the person skilled in the art, and encompass all of the organic compounds other than D) which have at least one ethylenic double bond. Among these are:

nitriles of (meth)acrylic acid, and other nitrogen-containing methacrylates, such as methacryloylamidoacetonitrile, 2-methacryloyoxyethylmethylcyanamide, cyanomethyl methacrylate;

(meth)acrylates which derive from saturated alcohols, such as methyl(meth)acrylate, ethyl(meth)acrylate, n-propyl (meth)acrylate, isopropyl(meth)acrylate, n-butyl(meth) acrylate, sec-butyl(meth)acrylate, tert-butyl (meth)acrylate, pentyl(meth)acrylate, hexyl (meth)acrylate, heptyl (meth)acrylate, 2-ethylhexyl (meth)acrylate, octyl(meth) acrylate, nonyl (meth)acrylate, isooctyl(meth)acrylate, isononyl (meth)acrylate, 2-tert-butylheptyl(meth)acrylate, 3-isopropylheptyl(meth)acrylate, decyl(meth)acrylate, undecyl(meth)acrylate, 5-methylundecyl(meth)acrylate, dodecyl(meth)acrylate, 2-methyldodecyl(meth)acrylate, tridecyl(meth)acrylate, 5-methyltridecyl (meth)acrylate, tetradecyl(meth)acrylate, pentadecyl (meth)acrylate, hexadecyl(meth)acrylate, 2-methylhexadecyl (meth)acrylate, heptadecyl(meth)acrylate, 5-isopropylheptadecyl (meth)acrylate, 4-tert-butyloctadecyl (meth)acrylate, 5-ethyloctadecyl(meth)acrylate, 3-isopropyloctadecyl (meth)acrylate, octadecyl (meth)acrylate, nonadecyl (meth)acrylate, eicosyl (meth)acrylate, cetyleicosyl(meth) acrylate, stearyleicosyl (meth)acrylate, docosyl(meth) acrylate, and/or eicosyltetratriacontyl(meth)acrylate;

cycloalkyl(meth)acrylates, such as cyclopentyl (meth)acrylate, cyclohexyl(meth)acrylate, 3-vinyl-2-butylcyclohexyl (meth)acrylate, and bornyl (meth)acrylate;

(meth)acrylates which derive from unsaturated alcohols, e.g. 2-propynyl(meth)acrylate, allyl(meth)acrylate, oleyl (meth)acrylate, and vinyl(meth)acrylate;

aryl(meth)acrylates, such as benzyl(meth)acrylate or phenyl (meth)acrylate where each of the aryl radicals may be unsubstituted or have up to four substituents;

di(meth)acrylates, such as 1,2-ethanediol di(meth)acrylate, 1,4-butanediol di(meth)acrylate, diethylene glycol di(meth)acrylate, dipropylene glycol di(meth)acrylate, triethylene glycol di(meth)acrylate, tripropylene glycol di(meth)acrylate, tetraethylene glycol di(meth)acrylate, tetrapropylene glycol di(meth)acrylate, polyethylene glycol di(meth)acrylate (preferably with a weight-average molar mass in the range from 200 to 5000000 g/mol, advantageously in the range from 200 to 25000 g/mol, in particular in the range from 200 to 1000 g/mol), polypropylene glycol di(meth)acrylate (preferably with a weight-average molar mass in the range from 200 to 5000000 g/mol, advantageously in the range from 250 to 4000 g/mol, in particular in the range from 250 to 1000 g/mol), 2,2'-thiodiethanol di(meth)acrylate (thiodiglycol di(meth) acrylate, 3,9-di(meth)acryloyloxymethyltricyclo[5.2.1.0 (2.6)]decane, in particular

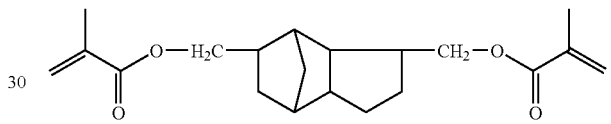

3,8-di(meth)acryloyloxymethyltricyclo[5.2.1.0(2.6)]-decane,
4,8-di(meth)acryloyloxymethyltricyclo[5.2.1.0(2.6)]-decane,
4,9-di(meth)acryloyloxymethyltricyclo[5.2.1.0(2.6)]-decane, ethoxylated bisphenol A di(meth)acrylate, in particular

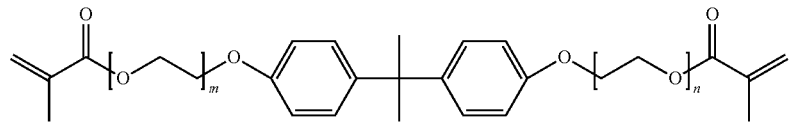

where m and n are greater than or equal to zero, and the sum m+n is preferably in the range from 1 to 3, in particular in the range from 1.5 to 2.5, and di(meth)acrylates obtainable via reaction of diisocyanates with 2 equivalents of hydroxyalkyl (meth)acrylate, in particular

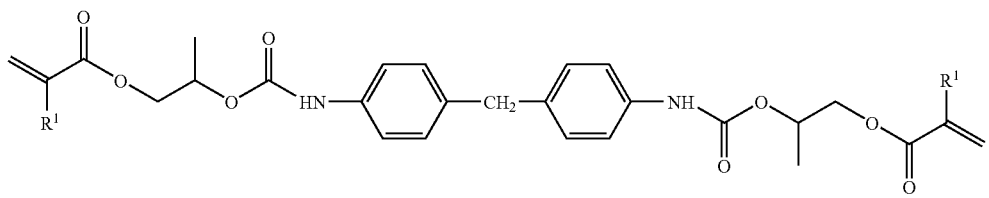

-continued

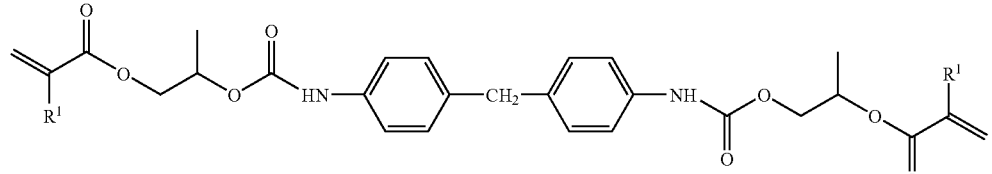

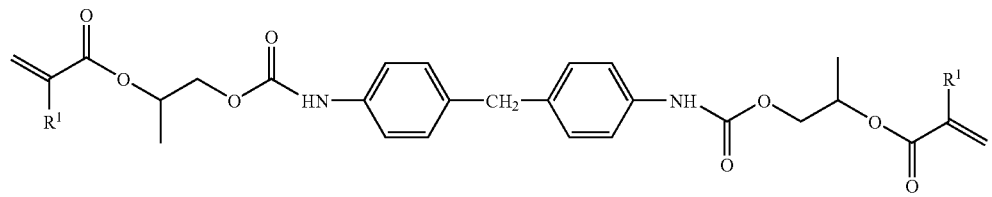

where each radical $R^1$, independently of the others, is hydrogen or a methyl radical;

carbonyl-containing (meth)acrylates, such as 2-carboxyethyl (meth)acrylate, carboxymethyl(meth)acrylate, oxazolidinylethyl(meth)acrylate, N-(methacryloyloxy)formamide, acetonyl(meth)acrylate, and N-methacryloyl-2-pyrrolidinone;

(meth)acrylates of ether alcohols, e.g. tetrahydrofurfuryl (meth)acrylate, vinyloxyethoxyethyl (meth)acrylate, methoxyethoxyethyl(meth)acrylate, 1-butoxypropyl (meth)acrylate, 1-methyl-(2-vinyloxy)ethyl (meth)acrylate, cyclohexyloxymethyl (meth)acrylate, methoxymethoxyethyl(meth)acrylate, benzyloxymethyl(meth)acrylate, furfuryl (meth)acrylate, 2-butoxyethyl(meth)acrylate, 2-ethoxyethoxymethyl (meth)acrylate, 2-ethoxyethyl (meth)acrylate, allyloxymethyl(meth)acrylate, 1-ethoxybutyl(meth)acrylate, methoxymethyl (meth)acrylate, 1-ethoxyethyl(meth)acrylate, and ethoxymethyl (meth)acrylate;

(meth)acrylates of halogenated alcohols, e.g. 2,3-dibromopropyl (meth)acrylate, 4-bromophenyl (meth)acrylate, 1,3-dichloro-2-propyl(meth)acrylate, 2-bromoethyl (meth)acrylate, 2-iodoethyl (meth)acrylate, and chloromethyl(meth)acrylate;

amides of (meth)acrylic acid, e.g. N-(3-dimethylaminopropyl)(meth)acrylamide, N-(diethylphosphono)(meth)acrylamide, 1-(meth)acryloylamido-2-methyl-2-propanol, N-(3-dibutylaminopropyl) (meth)acrylamide, N-tert-butyl-N-(diethylphosphono)(meth)acrylamide, N,N-bis(2-diethylaminoethyl)(meth)acrylamide, 4-(meth)acryloylamido-4-methyl-2-pentanol, N-(methoxymethyl)(meth)acrylamide, N-(2-hydroxyethyl)(meth)acrylamide, N-acetyl(meth)acrylamide, N-(dimethylaminoethyl)(meth)acrylamide, N-methyl-N-phenyl(meth)acrylamide, N,N-diethyl(meth)acrylamide, N-methyl(meth)acrylamide, N,N-dimethyl(meth)acrylamide, and N-isopropyl (meth)acrylamide;

heterocyclic (meth)acrylates, such as 2-(1-imidazolyl)ethyl (meth)acrylate, and 1-(2-methacryloyloxyethyl)-2-pyrrolidone;

phosphorus-, boron-, and/or silicon-containing (meth)acrylates, such as 2-(dimethylphosphato)propyl (meth)acrylate, 2-(ethylenephosphito)propyl (meth)acrylate, dimethylphosphinomethyl(meth)acrylate, dimethylphosphonoethyl(meth)acrylate, diethyl (meth) acryloylphosphonate, and dipropyl(meth)acryloyl phosphate;

sulfur-containing (meth)acrylates, such as ethylsulfinylethyl (meth)acrylate, 4-thiocyanatobutyl (meth)acrylate, ethylsulfonylethyl(meth)acrylate, thiocyanatomethyl(meth) acrylate, methylsulfinylmethyl (meth)acrylate, and bis ((meth)acryloyloxyethyl) sulfide;

tri(meth)acrylates, such as trimethylolpropane tri(meth)acrylate and glycerol tri(meth)acrylate;

bis(allyl carbonates), such as ethylene glycol bis(allyl carbonate), 1,4-butanediol bis(allyl carbonate), diethylene glycol bis(allyl carbonate);

vinyl halides, such as vinyl chloride, vinyl fluoride, vinylidene chloride, and vinylidene fluoride;

vinyl esters, such as vinyl acetate;

styrene, substituted styrenes having an alkyl substituent in the side chain, e.g. α-methylstyrene and α-ethylstyrene, substituted styrenes having an alkyl substituent on the ring, e.g. vinyltoluene and p-methylstyrene, halogenated styrenes, such as monochlorostyrenes, dichlorostyrenes, tribromostyrenes, and tetrabromostyrenes;

heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyrolactam, vinyloxolane, vinylfuran, vinylthiophene, vinylthiolane, vinylthiazoles, and hydrogenated vinylthiazoles, vinyloxazoles, and hydrogenated vinyloxazoles;

vinyl ethers and isoprenyl ethers;

maleic acid and maleic acid derivatives, e.g. mono- and diesters of maleic acid, the alcohol radicals having from 1 to 9 carbon atoms, maleic anhydride, methylmaleic anhydride, maleimide, methylmaleimide;

fumaric acid and fumaric acid derivatives, e.g. mono- and diesters of fumaric acid, the alcohol radicals having from 1 to 9 carbon atoms;

and also dienes, such as 1,2-divinylbenzene, 1,3-divinylbenzene, 1,4-divinylbenzene, 1,2-diisopropenylbenzene, 1,3-diisopropenylbenzene, and 1,4-diisopropenylbenzene.

According to the invention, particularly advantageous results can be achieved by using at least 50% by weight, preferably at least 70% by weight, advantageously at least 80% by weight, in particular at least 90% by weight, based on the total amount of ethylenically unsaturated monomers E), of at least one (meth)acrylate of the formula (III) as ethylenically unsaturated monomer E)

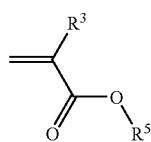

In this context $R^3$ is a hydrogen atom or a methyl group, preferably a methyl group, and $R^5$ is an aliphatic or cycloaliphatic radical having from 1 to 20 carbon atoms, advantageously from 1 to 8 carbon atoms, in particular from 1 to 4 carbon atoms. Particularly preferred (meth)acrylates here encompass methyl(meth)acrylate, ethyl(meth)acrylate, propyl (meth)acrylate, and butyl(meth)acrylate, in particular methyl methacrylate.

According to the invention, it is also possible to admix one or more polymers and/or copolymers F) with the composition, in order, by way of example, to increase the viscosity and thus improve the processability of the inventive composition. The copolymers and monomers which may be used in this context derive from the abovementioned ethylenically unsaturated monomers E), and are obtainable via polymerization or copolymerization of at least one of the abovementioned ethylenically unsaturated monomers E). The polymerization preferably takes place via a free-radical route, in particular using at least one of the free-radical polymerization initiators mentioned below.

According to the invention, particularly preferred polymers and copolymers are obtainable via polymerization or copolymerization of ethylenically unsaturated monomers E) which comprise at least 50% by weight, preferably at least 70% by weight, advantageously at least 80% by weight, in particular at least 90% by weight, based on the total amount of ethylenically unsaturated monomers E), of at least one (meth) acrylate of the formula (III) as ethylenically unsaturated monomer E)

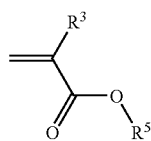

In this context, too, $R^3$ is a hydrogen atom or a methyl group, preferably a methyl group, and $R^5$ is an aliphatic or cycloaliphatic radical having from 1 to 20 carbon atoms, advantageously from 1 to 8 carbon atoms, in particular from 1 to 4 carbon atoms. Particularly preferred (meth)acrylates here encompass methyl(meth)acrylate, ethyl(meth)acrylate, propyl (meth)acrylate, and butyl(meth)acrylate, in particular methyl methacrylate.

The polymers and/or copolymers F) are advantageously soluble in the inventive composition and compatible therewith, and also with the polymerized mixture. Previously prepared polymers and/or copolymers which are soluble in the monomeric mixture and are compatible therewith, but not with the polymerized mixture, give translucent polymeric mixtures. These are often advantageous for decorative purposes.

The molar mass of the polymers and/or copolymers F) may be selected as required by the desired property profile. However, it has proven very advantageous to use polymers and/or copolymers whose number-average molecular weight is in the range from 1000 to 1000000000 g/mol, in particular in the range from 10000 to 500000 g/mol. The number-average molar mass here is preferably determined by means of size-exclusion chromatography (GPC), using linear polystyrene as internal standard.

For the purposes of one very particularly preferred embodiment of the present invention, the polymers and/or copolymers F) used comprise impact modifiers, in particular core-shell or core-shell 1-shell 2 particles.

The impact modifiers suitable for cast sheet and described in the specification DE 102 035 65.2 have proven particularly advantageous here. These preferably have the following composition

| Core: | 94-97% by weight | methyl methacrylate |
|---|---|---|
|  | 2-5% by weight | ethyl acrylate |
|  | 1-0.1% by weight | crosslinking agent |
| Shell 1: | 79-82% by weight | butyl acrylate |
|  | 13-18% by weight | styrene or α-methyl-styrene |
|  | 0.1-1% by weight | crosslinking agent |
| Shell 2: | 90-98% by weight | methyl methacrylate |
|  | 10-2% by weight | ethyl acrylate |

Examples of crosslinking agents which may be used in the impact modifier (core or shell 1) are di(meth)acrylates, divinylbenzenes or allyl (meth)acrylates. Mixtures of the crosslinking agent components are also possible. The ratio by weight core:shell 1:shell 2 is preferably 20-30:30-50:20-40% by weight. By way of example, EP 0 828 772, or U.S. Pat. Nos. 3,793,402, or 4,690,986 describe impact modifiers and their preparation. For further details, reference is made to the disclosure of the above-mentioned specifications, and in particular to DE 102 035 65.2. The proportion of the impact modifiers is preferably from 1 to 100% by weight, based on the total weight of the polymers and/or copolymers F). Based on the inventive composition, the proportion of the impact modifiers is preferably from 0.5 to 30% by weight.

In this context, it has moreover proven very particularly advantageous to admix from 0.1 to 10 parts by weight of at least one impact modifier and from 29.9 to 20 parts by weight of at least one linear or branched polymer and/or copolymer as polymer and/or copolymer F) with the inventive composition. Linear or branched polymers and/or copolymers in this context are polymers and/or copolymers which are obtainable via single-stage, preferably free-radical, cationic, or anionic, polymerization, in particular in bulk.

The polymers and/or copolymers F) may be prepared in a conventional manner, e.g. via free-radical, anionic, or cationic polymerization. Use may be made here of the known polymerization processes, such as emulsion polymerization, bulk polymerization, mass polymerization, or solution polymerization. Either single- or multistage polymerization processes are possible here, an example being a multistage emulsion polymerization which leads to the known core-shell particles which, by way of example, are often used as impact modifiers for molding compositions. For further details, reference is made to the technical literature, in particular to H. G. Elias, Makromoleküle [Macromolecules], volumes 1 and 2, Basle, Heidelberg, New York Hüthig and Wepf., 1990 and Ullmann's Encyclopedia of Industrial Chemistry, 5th edn., headword "Polymerization Processes".

For the purposes of one particularly preferred embodiment of the present invention, a mixture is used composed of ethylenically unsaturated monomers E) and of polymers and/or copolymers F) the mixture being obtained via partial polymerization of at least one ethylenically unsaturated monomer E). To this end, the at least one ethylenically unsaturated monomer E), preferably MMA, is advantageously treated with an initiator and preferably polymerized by heating. The polymerization is advantageously terminated via cooling or stopping with an inhibitor at a certain juncture, so that the desired viscosity is established. The resultant syrup can then be treated with the other inventive components, poured into the mold, and polymerized to completion.

Alongside the abovementioned components, other conventional additives, such as fillers, in particular glass fibers and glass textiles, or else pigments, may be present, where appropriate, in the inventive compositions, and particular preference is given here to the coloring of the polymers obtainable from the inventive compositions. Further details concerning the coloring of polymers may be found in the prior art, in particular in the following publications:

Vieweg-Esser, Kunstoffhandbuch [Plastics Handbook], volume IX, "Polymethacrylate" [Polymethacrylates], C. Hanser Verlag 1975

Batzer, Polymere Werkstoffe [Polymeric materials], vol. II, Technologie 1. [Technology 1.] pp. 337-353, Georg Thieme Verlag 1984)

Balzer, Polymere Werkstoffe [Polymeric materials], loc. cit., pp. 349 (in particular concerns: Use of color pastes)

DE-A 15 92 897 (in particular concerns: Pigment preparations for coloring plastics)

GB Patent 1 148 168 (in particular concerns:

Pigment pastes)

U.S. Pat. No. 3,471,433 (in particular concerns: Pigment masterbatches)

and the disclosure thereof is expressly incorporated herein by way of reference.

To prepare the inventive compositions, the product from the reaction a) is preferably mixed with the other components D) to F), and advantageously stirred, until a homogeneous solution is obtained. The sequence of the additions here is not highly significant, but it is preferable for the monomers present in relatively small amounts to be added to the main monomer(s). If a mixture with relatively high viscosity is desired, the procedure, as described above, is to prepare a homogeneous solution, add the desired amount of a polymer, e.g. polymethyl methacrylate, and stir the mixture until this solution, too, is homogeneous.

The mixtures of the invention can also react without addition of a polymerization catalyst, and their reactivity here depends on the combination used. If the intention is to use the mixtures shortly after preparation, there is no need to add an inhibitor. Their lifetime can also be substantially prolonged by storage with cooling. If prolonged storage is required, or if they are to be dispatched by normal commercial means, it is generally necessary to use polymerization inhibitors. Suitable inhibitors are agents which inhibit vinyl polymerization, e.g. tert-butylcatechol, hydroquinone, hydroquinone monoethyl ether, and 2,5-ditert-butylhydroquinone. The amounts required vary, depending on the monomer composition and the storage conditions, but are generally in the range from 0.005 to 0.1% by weight, based on the total weight of the composition.

The inventive composition is preferably polymerized via mass polymerization or bulk polymerization. Mass polymerization or bulk polymerization here is a polymerization process in which monomers are polymerized without solvent, the polymerization reaction therefore proceeding in bulk. This differs from polymerization in emulsion (known as emulsion polymerization) and polymerization in a dispersion (known as suspension polymerization), in which the organic monomers are suspended in an aqueous phase with protective colloids and/or stabilizers, and relatively coarse polymer particles are formed. One particular form of polymerization in a heterogeneous phase is bead polymerization, which in essence is a type of suspension polymerization.

In principle, the polymerization reaction may be initiated in any manner familiar to the person skilled in the art, for example using a free-radical initiator (e.g. peroxide, azo compound), or via irradiation with UV radiation, or with visible light, α-radiation, β-radiation, or γ-radiation, or via a combination of these.

In one preferred embodiment of the present invention, one or more lipophilic free-radical polymerization initiators are used to initiate the polymerization. The free-radical polymerization initiators are in particular lipophilic in order to dissolve in the mixture for bulk polymerization. Among compounds which may be used, besides the traditional azo initiators, such as azoisobutyronitrile (AIBN), 1,1-azobiscyclohexanecarbonitrile and azobis(2,4-dimethylvaleronitrile), are aliphatic peroxy compounds, e.g. tert-amyl peroxyneodecanoate, tert-amyl peroxypivalate, tert-butyl peroxypivalate, tert-amyl 2-ethylperoxyhexanoate, tert-butyl 2-ethylperoxyhexanoate, tert-amyl 3,5,5-trimethylperoxyhexanoate, ethyl 3,3-di(tert-amylperoxy)butyrate, tert-butyl perbenzoate, tert-butyl hydroperoxide, decanoyl peroxide, lauryl peroxide, benzoyl peroxide, and any desired mixtures of the compounds mentioned. Among the above-mentioned compounds, very particular preference is given to AIBN.

In another preferred embodiment of the present invention, the polymerization is initiated by using known photoinitiators via irradiation with UV radiation or the like. Use may be made here of the familiar, commercially available compounds, such as benzophenone, α,α-diethoxyacetophenone, 4,4-diethylaminobenzophenone, 2,2-dimethoxy-2-phenylacetophenone, 4-isopropylphenyl 2-hydroxy-2-propyl ketone, 1-hydroxycyclohexyl phenyl ketone, isoamyl p-dimethylaminobenzoate, methyl 4-dimethylaminobenzoate, methyl o-benzoylbenzoate, benzoin, benzoin ethyl ether, benzoin isopropyl ether, benzoin isobutyl ether, 2-hydroxy-2-methyl-1-phenylpropan-1-one, 2-isopropylthioxanthone, dibenzosuberone, 2,4,6-trimethylbenzoyldiphenylphosphine oxide, bisacylphosphine oxide, and other compounds, and all of the photoinitiators mentioned here may be used alone or in a combination of two or more, or in combination with one of the above polymerization initiators.

For the purposes of the present invention, the selection of the polymerization initiators advantageously depends on the desired thickness of the polymer pane. For producing thin sheets whose thickness is <100 mm it is preferable to use azo initiators or peroxides as polymerization initiators. Thicker sheets whose thickness is >100 mm are advantageously produced using photoinitiators, because the polymerization, and the heat dissipation associated therewith, is more easily controlled.

The amount of the free-radical generators may vary widely. By way of example, it is preferable to use amounts in the range of 0.01 to 5.0% by weight, based on the weight of the entire composition. Particular preference is given to amounts in the range from 0.01 to 2.0% by weight, in particular to amounts in the range from 0.01 to 0.5% by weight, based in each case on the weight of the entire composition.

The polymerization temperature to be selected for the polymerization is obvious to the person skilled in the art. It is primarily determined via the initiator(s) selected and the initiation method (thermal, via irradiation, etc.). It is known that the polymerization temperature can affect the properties of a polymer product. For the purposes of the present invention, therefore, preference is given to polymerization temperatures in the range from 20.0 to 100.0° C., advantageously in the range from 20.0 to 80.0° C., in particular in the range from 20.0 to 60.0° C. In one particularly preferred embodiment of the present invention, the reaction temperature is increased during the reaction, preferably in stages. Heat-conditioning at an elevated temperature, for example 100° C., toward the end of the reaction has also proven advantageous.

For the purposes of the present invention it is moreover particularly advantageous to select the particular specific polymerization conditions as a function of the desired thickness of the polymer pane. Relatively thick panes are preferably polymerized more slowly than thin panes by selecting a lower level of polymerization conditions and smaller amounts of initiator, in order to ensure dissipation of heat.

The reaction may be carried out either at subatmospheric pressure or else at superatmospheric pressure. However, it is preferably carried out at atmospheric pressure. The reaction may take place in air or else under an inert gas, the proportion of oxygen present preferably being minimized, because it inhibits any possible polymerization.

According to the present invention, the inventive compositions are preferably used to produce laminated glass, by polymerizing the inventive mixtures, where appropriate including one of the initiators described above, between two thin glass sheets, which are appropriately held in a polymerization cell. This gives laminated glass composed of a transparent plastics core and of two glass panes securely bonded thereto, preferably silicate glass panes. According to the invention, particularly preferred laminated glass has a plastics core whose thickness is in the range from 1 to 200 mm, in particular in the range from 1 to 10 mm, and glass panes whose thickness is in the range from 0.1 to 3 mm.

According to the invention, glass denotes substances in an amorphous, non-crystalline solid state. The glassy state can be interpreted in physico-chemical terms as a frozen supercooled liquid or frozen supercooled melt. Practically any substance can be converted to a metastable glassy state when a melt is cooled at a sufficiently high rate, or when molecules are condensed from the vapor phase onto substrates subjected to extreme levels of cooling. For the purposes of the present invention, glass is in particular inorganic, preferably oxidic melt products which are converted to the solid state via a freezing procedure without crystallization of the melt-phase components.

Particularly preferred inventive glasses encompass cooled melts which comprise silicon dioxide ($SiO_2$), calcium oxide (CaO), sodium oxide ($Na_2O$), sometimes with relatively large amounts of boron trioxide ($B_2O_3$), aluminum oxide ($Al_2O_3$), lead oxide (PbO), magnesium oxide (MgO), barium oxide (BaO), and/or potassium oxide ($K_2O$), in particular silicon dioxide ($SiO_2$). For further details, reference is made to the familiar technical literature, for example to CD Römpp Chemie Lexikon [Römpp's chemical encyclopedia on CD], Version 1.0, Stuttgart/New York; Georg Thieme Verlag; 1995; headword: Glass.

There are no particular restrictions on the polymerization cells which may be used according to the invention, and indeed any of the cells known from the prior art may be used. By way of example, use may be made of polymerization cells composed of glass and/or of polished stainless steel sheets.

Although it is known that traces of oxygen mostly interfere with the polymerization process and sometimes can indeed prevent it, it is not generally necessary for the purposes of the present invention to devolatilize the inventive compositions prior to polymerization. However, in one preferred embodiment of the present invention, the inventive composition is devolatalized, in particular if it comprises polymer and/or copolymers F), in order to remove included air bubbles, and also dissolved oxygen. The polymerization is moreover preferably carried out with exclusion of oxygen.

The inventive laminated glass has high hail resistance, preferably with fracture energy>1.2 J, high bond strength, high stiffness, preferably with deflection<1 mm, high gas impermeability, preferably with water vapor permeability to DIN 53122<0.05 g/m², in particular <0.01 g/m², in 24 h, high scratch resistance, preferably with haze to DIN 52347<1%, high impact strength, high chemicals resistance, and also low density, preferably <2.6 kg/l, in particular <2.0 kg/l. Possible application sectors for the inventive laminated glass are obvious to the person skilled in the art. It is particularly suitable for any of the applications predestined for laminated glass.

Its characteristic properties make it especially suitable for windows, roof windows, glass doors, conservatory glazing, greenhouse glazing, noise barriers with particularly good suitability for complete removal of graffiti, aquariums, display cases, sales counters, security display cases, display windows, e.g. in jewelry shops, and/or balcony parapets.

The high specific adhesion of the inventive compositions to glass also gives them wide scope for uses which require bonding of glass to various other surfaces. They can therefore be used for bonding glass to glass, for example in the production of composite lenses, in the bonding of glass or plastics articles to metal surfaces, and in the bonding of plastics articles to glass surfaces.

An inventive example and a comparative example are used below for more detailed illustration of the invention, but there is no intention that the invention be restricted to this inventive example.

INVENTIVE EXAMPLE

TABLE 1

Formulation

| No. | Material | Amount [g] | Amount [%] |
|---|---|---|---|
| 1 | MMA | 2910.6 | 97.02 |
| 2 | γ-Methacryloxypropyltriethoxysilane | 30.0 | 1.0 |
| 3 | Water | 6.0 | 0.2 |
| 4 | Methacrylic acid | 1.2 | 0.04 |
| 5 | Glycidyl methacrylate | 51.0 | 1.7 |
| 6 | Azobis (isobutyronitrile) | 0.9 | 0.03 |
| 7 | Azobis (2,4-dimethylvaleronitrile) | 0.3 | 0.01 |

Experimental Method

Reactants 1, 5, 6, and 7 were mixed (solution A) Separately from this, reactants 2, 3, and 4 were combined and stirred for 1 h until a homogeneous phase has formed (solution B). The two solutions were combined and charged to a polymerization cell which encompassed two outer panes composed of supportive glass of thickness from about 6 to 8 mm. A thin pane of silicate glass of thickness from about 0.4 to 1.0 mm had been arranged on each of the inner sides of the supportive panes. A sealing bead, composed of PVC for example and of variable thickness was used for sealing between the two thin panes.

Depending on the desired thickness of the PMMA sheet, the polymerization reaction was carried out at from 30 to 45° C. for from 17 to 75 h. The sealing bead had to be removed here after a certain polymerization time; after 32 h at 30° C. for a PMMA core of 18 mm, for example, in order to prevent irreversible damage to the sheet through shrinkage.

After polymerization, the composite was heat-conditioned for 3 h at 100° C. The outer supportive glass could then be removed. Where appropriate, the resultant laminated glass was cut to the desired size, using a water jet.

COMPARATIVE EXAMPLE 1

The method was as in the inventive example, but the solution B was not hydrolyzed, i.e. the components were mixed with one another and directly polymerized.

The resultant sheets separated before leaving the water bath, or the thin glass sheets parted directly after removal of the sealing bead in the polymerization bath.

COMPARATIVE EXAMPLES 2-4

The method was as in the inventive example, but component 3 (comparative example 2), 4 (comparative example 3), or 5 (comparative example 4) was omitted. In the resultant sheets, the thin glass sheets separated during or after the polymerization of the PMMA core. Some of this separation took place abruptly in the heat-conditioning cabinet, forming splinters.

A. Hail-Resistance Test

Laminated glass panes of various thicknesses were subjected to the hail-impact test based on the Swiss standard SEA-V 280 in comparison with silicate glass panes. The panes were subjected to impact from polyamide beads, 20 mm diameter, weight 4.49 g. The energy required from the beads to break the panes was determined. The maximum energy withstood by the pane without breaking was determined. The appearance of the fracture was assessed. The results are given in table 2.

Table 2 shows that a silicate glass of thickness 6 mm breaks when the fracture energy is as low as from 1.0 to 1.2 J, whereas more than 1.5 times that amount of energy is required to break a laminated pane of total thickness 3.8 mm with outer glass panes of thickness only 0.4 mm. Laminated glass of thickness 5 mm did not break even at 3.6 J, corresponding to a velocity of 38.82 m/s for the polyamide beads. This value is so high that the test had to be terminated to avoid damage to the test apparatus.

TABLE 2

Hail-impact test on laminated glass

| No. | Glass thickness [mm] | Core thickness [mm] | Total thickness [mm] | Fracture energy [J] | Appearance of fracture |
|---|---|---|---|---|---|
| 1 | 0.4 | 3.0 | 3.8 | 0.7 | Star-shaped crack |
| 2 | 0.4 | 3.0 | 3.8 | 1.6 | Star-shaped crack |
| 3 | 1.0 | 3.0 | 5.0 | 1.2 | Star-shaped crack |
| 4 | 1.0 | 3.0 | 5.0 | 3.6 | Star-shaped crack |
| 5 | 6.0 | Silicate glass comparison | 6.0 | 1.0 | Undamaged |
| 6 | 6.0 | Silicate glass comparison | 6.0 | 1.0 | Shattered |
| 7 | 6.0 | Silicate glass comparison | 6.0 | 1.2 | Shattered |

B. Bond Strength

In a test involving storage in water with exposure to temperature cycles: 7 h hot, 17 h cold, the cycle to which the inventive composite sheets were subjected comprised 7 h at 50° C., after which the heating was switched off, the material was allowed to cool to room temperature, and the heating was switched on again 17 h after the start of the cooling process. The test was carried out over a period of >4 months, with no change observed in the composite.

C. Stiffness

A bar composed of the material and having dimensions: 300×40×5 mm was placed on two supports separated by 250 mm, and a weight (500 ml polyethylene bottle, filled with lead shot, weight 3500 g) was placed centrally on the bar. The deflection was measured. The results obtained are given in table 3.

TABLE 3

Stiffness

| No. | Material | Deflection [mm] |
|---|---|---|
| 7 | PMMA | 12 |
| 4 | Laminated glass (1 mm/3 mm/1 mm) | <1 |

D. Gas Impermeability

The water vapor permeability of the materials was determined to DIN 53122, sheet 1 (11/1974). Argon permeability was determined analogously. The results obtained are given in table 4.

TABLE 4

Water vapor permeability to DIN 53122

| Material | Thickness [mm] | Water vapor permeability [g/m$^2$] in 24 h | Argon permeability [g/m$^2$] in 24 h |
|---|---|---|---|
| PMMA | 5 | 0.2 | — |
| Silicate glass | 5 | 0 | 0 |
| Laminated glass (1 mm/3 mm/1 mm) | 5 | 0 | 0 |

E. Scratch Resistance

Scratch resistance is measured using the Taber Abraser to DIN 52347 with 5.4 N load at 100 rpm. The values obtained are given in table 5.

TABLE 5

Scratch resistance

| Material | Haze [%] |
|---|---|
| PMMA | 20-30 |
| Silicate glass | <1 |
| Laminated glass (1 mm/3 mm/1 mm) | <1 |

F. Impact Strength

If a horizontally placed laminated glass pane and, for comparison, a silicate glass pane are hit with a hammer (weight: 255 g), the impact strength is clearly seen.

As expected, the silicate glass pane shatters into many splinters; the inventive laminated glass pane exhibits a star-shaped crack only at the impact point.

G. Density

The weight of the laminated pane is a function of the densities of the constituents: acrylic sheet contributes in relation to its proportion by volume with a density of 1.2 kg/l; silicate glass has a density of 2.6 kg/l. The total weight of the laminated pane is a function of the proportions by volume of the components, and is more favorable for a relatively thick core and relatively thin outer panes, and correspondingly less favorable for relatively thick outer panes and a relatively thin core.

H. Chemicals Resistance

The chemicals resistance of the inventive laminated panes is the same as that of silicate glass.

What is claimed is:

1. A polymerizable composition prepared by:
   a) mixing and reacting in a medium
      A) from 0.5 to 5 parts by weight of at least one silicon compound of the formula (I):

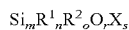
      $$Si_m R^1_n R^2_o O_r X_s \quad (I)$$

where each $R^1$, independently of the others, is an alkenyl or cycloalkenyl radical having from 2 to 12 carbon atoms and optionally having one or more ester groups,
      each $R^2$, independently of the others, is an alkyl or cycloalkyl radical having from 1 to 12 carbon atoms,
      each X, independently of the others, is a halogen atom or an alkoxy group having from 1 to 6 carbon atoms,
      m is a whole number greater than or equal to 1,
      n is a whole number from 1 to 2*m+1,
      o is a whole number from 0 to 2*m,
      r is a whole number from 0 to m−1,
      s is a whole number from 1 to 2*m+1, and
      where m, n, o, and s comply with the relationship (1):

$$n+o+s=2*m+2 \quad (1)$$

with
   B) from 0.01 to 2.0 parts by weight of water, and
   C) from 0.01 to 4.0 parts by weight of at least one acid;
   thereby hydrolyzing the alkoxy groups, wherein the hydrolysis is carried out until a water phase initially present has disappeared during the reacting a) and a homogeneous single phase of the hydrolyzed mixture is obtained, and
   b) then adding to the homogeneous phase of a)
      D) from 0.5 to 5 parts by weight of at least one (meth)acrylate of the formula (II)

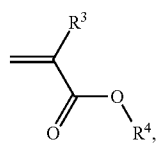

where $R^3$ is a hydrogen atom or a methyl group, and $R^4$ is an aliphatic or cycloaliphatic radical having from 1 to 20 carbon atoms and having at least one hydroxy, thiol, primary amino, secondary amino, and/or one epoxy group,
      E) from 98.99 to 55 parts by weight of at least one polymerizable ethylenically unsaturated monomer other than D),
      F) from 0 to 30 parts by weight of at least one polymer and/or copolymer which is obtainable via polymerization or, respectively, copolymerization of at least one ethylenically unsaturated monomer E).

2. The composition as claimed in claim 1, obtained by using at least one silicon compound of the formula (Ia)

$$SiR^1_n X_s \quad (Ia)$$

as the silicon compound A).

3. The composition as claimed in claim 1, obtained by using a mixture comprising at least one silicon compound of the formula (Ia)

$$SiR^1_n X_s \quad (Ia)$$

and at least one silicon compound of the formula (Ib)

$$SiR^2_o X_s \quad (Ib)$$

as the silicon compound A).

4. The composition as claimed in claim 1, using at least one silicon compound of the formula (Ic)

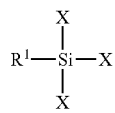

as the silicon compound A).

5. The composition as claimed in claim 1, obtained by using γ-methacryloxypropyltriethoxysilane, γ-acryloxypropyltriethoxysilane, γ-methacryloxypropyltrimethoxysilane, γ-acryloxypropyltrimethoxysilane and/or vinyltriethoxysilane as the silicon compound A).

6. The composition as claimed in claim 5, obtained by using γ-methacryloxypropyltriethoxysilane as the silicon compound A).

7. The composition as claimed in claim 1, obtained by carrying out the reacting a) at a temperature in the range from 0 to 100° C.

8. The composition as claimed in claim 1, obtained by carrying out the reacting a) for from 15 minutes to 48 hours.

9. The composition as claimed in claim 1, obtained by using at least one hydroxyalkyl (meth)acrylate, aminoalkyl (meth)acrylate, oxiranyl(meth)acrylate, and/or mercaptoalkyl (meth)acrylate, as the (meth)acrylate D).

10. The composition as claimed in claim 1, obtained by using glycidyl(meth)acrylate as the (meth)acrylate D).

11. The composition as claimed in claim 1, obtained by using at least one (meth)acrylate of the formula (III) as the ethylenically unsaturated monomer E)

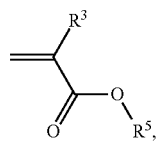

where $R^3$ is a hydrogen atom or a methyl group, and $R^5$ is a aliphatic or cycloaliphatic radical having from 1 to 20 carbon atoms, wherein an amount of the (meth)acrylate of the formula (III) is at least 50% by weight of the total amount of the ethylenically unsaturated monomers E).

12. The composition as claimed in claim 11, obtained by using a methyl methacrylate as the ethylenically unsaturated monomer E), wherein an amount of the methyl (methyl) acrylate is at least 50% by weight of the total amount of the ethylenically unsaturated monomers E).

13. The composition as claimed in claim 1, wherein at least one impact modifier is used as the polymer and/or copolymer F).

14. The composition as claimed in claim 1, wherein a mixture comprising from 0.1 to 10 parts by weight of at least one impact modifier and from 29.9 to 20 parts by weight of at least one linear or branched polymer and/or copolymer, is used as the polymer and/or copolymer F).

15. The composition as claimed in claim 1, further comprising from 0.01 to 5 parts by weight of at least one lipophilic free-radical polymerization initiator.

16. A polymer obtained via polymerization of the composition as claimed in claim 1.

17. A laminated glass comprising a transparent plastics core and of two glass panes securely bonded thereto, where the plastics core is obtained via polymerization of the composition as claimed in claim 1.

18. A window, a roof window, a glass door, a conservatory, a greenhouse, a noise barrier, an aquarium, a display case, a sales counter, a security display case, a display window, and/or balcony parapets comprising the laminated glass as claimed in claim 17.

19. The laminated glass as claimed in claim 17, wherein the plastics core has a thickness in the range from 1 to 200 mm and the glass panes have a thickness in the range from 0.1 to 3 mm.

20. A window, a roof window, a glass door, a conservatory, a greenhouse, a noise barrier, an aquarium, a display case, a sales counter, a security display case, a display window, and/or balcony parapets comprising the laminated glass as claimed in claim 19.

21. A process for producing a laminated glass as claimed in claim 17, wherein the composition is incorporated into a composite and exposed to polymerization conditions.

22. The process as claimed in claim 21, wherein the composition is devolatilized prior to the polymerization process.

* * * * *